United States Patent
Zhao

(10) Patent No.: US 12,438,646 B2
(45) Date of Patent: Oct. 7, 2025

(54) SIDELINK FEEDBACK INFORMATION PROCESSING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 464 days.

(21) Appl. No.: 17/936,125

(22) Filed: Sep. 28, 2022

(65) Prior Publication Data

US 2023/0085264 A1    Mar. 16, 2023

Related U.S. Application Data

(63) Continuation of application No. PCT/CN2020/083375, filed on Apr. 3, 2020.

(51) Int. Cl.
*H04L 1/18* (2023.01)
*H04L 1/1822* (2023.01)
(Continued)

(52) U.S. Cl.
CPC .......... *H04L 1/1822* (2013.01); *H04L 1/1854* (2013.01); *H04L 5/0053* (2013.01); *H04W 72/20* (2023.01); *H04L 1/1812* (2013.01)

(58) Field of Classification Search
CPC ... H04W 28/04; H04W 72/04; H04W 72/042; H04W 88/08; H04W 72/20;
(Continued)

(56) References Cited

U.S. PATENT DOCUMENTS

| | | | |
|---|---|---|---|
| 11,722,265 B2 * | 8/2023 | Zhou | H04L 1/1896 370/329 |
| 2017/0289869 A1 | 10/2017 | Nogami et al. | |

(Continued)

FOREIGN PATENT DOCUMENTS

| | | | | |
|---|---|---|---|---|
| CN | 101593154 A | 12/2009 | | |
| CN | 103874048 A | 6/2014 | | |
| CN | 108886447 A | * 11/2018 | .......... | H04W 72/042 |

OTHER PUBLICATIONS

3GPP TSG RAN WG1 #100, e-Meeting, Feb. 24-Mar. 6, 2020, R1-2000316, Source: vivo, Title: remaining issues on mode 1 resource allocation mechanism, Agenda Item: 7.2.4.2.1. (Year: 2020).*

(Continued)

*Primary Examiner* — Peter G Solinsky
*Assistant Examiner* — Sanjay K Dewan
(74) *Attorney, Agent, or Firm* — PERKINS COIE LLP

(57) ABSTRACT

A Sidelink (SL) feedback information processing method includes that: a terminal device acquires a time interval set, an element in the time interval set being used to determine a time interval between an SL feedback channel and an Uplink (UL) transmission channel, and the UL transmission channel being used to carry SL feedback information reported by the terminal device to a network device; and The terminal device acquires, according to a slot for the UL transmission channel and the time interval set, the SL feedback information carried by the UL transmission channel.

20 Claims, 21 Drawing Sheets

200

A terminal device acquires a time interval set, an element in the time interval set being used to determine a time interval between an SL feedback channel and a UL transmission channel — S210

The terminal device acquires, according to a slot for the UL transmission channel and the time interval set, the SL feedback information carried by the UL transmission channel — S220

(51) Int. Cl.
    *H04L 1/1829* (2023.01)
    *H04L 5/00* (2006.01)
    *H04W 72/04* (2023.01)
    *H04W 72/20* (2023.01)
    *H04L 1/1812* (2023.01)

(58) Field of Classification Search
    CPC ............ H04W 72/0406; H04L 5/0007; H04L 1/1822; H04L 1/1854; H04L 1/1812; H04L 5/0053
    USPC ........................................................ 370/329
    See application file for complete search history.

(56) References Cited

U.S. PATENT DOCUMENTS

2017/0325216 A1* 11/2017 Nogami ............... H04L 5/0055
2020/0106566 A1* 4/2020 Yeo ...................... H04L 1/1854

OTHER PUBLICATIONS

3GPP TSG-RAN WG1 Meeting #100, e-Meeting, Feb. 24-Mar. 6, 2020, R1-2000779, (revision of R1-2000777), Agenda Item: 7.2.4.2.1, Source: Ericsson, Title: Feature lead summary#2 on Resource allocation for NR sidelink Mode 1. (Year: 2020).*
3GPP TSG RAN WG1 #99, Reno, USA, Nov. 18-22, 2019, R1-1912367, Agenda Item: 7.2.4.2.1, Source: ITL, Title: Mode-1 resource allocation for NR V2X. (Year: 2019).*
3GPP TSG RAN WG1 #98bis, Chongqing, China, Oct. 14-20, 2019, R1-1910797, Agenda Item: 7.2.4.5, Source: ITL, Title: Physical layer procedure for NR V2X. (Year: 2019).*
VIVO, "Remaining issues on mode 1 resource allocation mechanism", 3GPP TSG RAN WG1 #100 e-Meeting R1-2000316, Feb. 24-Mar. 6, 2020 (18 pages).
Ericsson, "Feature lead summary#2 on Resource allocation for NR sidelink Mode 1", 3GPP TSG RAN WG1 #100 e-Meeting R1-2000779 (revision of R1-2000777), Feb. 24-Mar. 6, 2020 (2 pages).
International Search Report in the international application No. PCT/CN2020/083375, mailed on Dec. 28, 2020 with English translation (5 pages).
Written Opinion of the International Search Authority in the international application No. PCT/CN2020/083375, mailed on Dec. 28, 2020 with English translation (6 pages).
OPPO, "Remaining issues of mode 1 resource allocation for NR-V2X", 3GPP TSG RAN WG1 #100 e-Meeting R1-2000490, Feb. 24-Mar. 6, 2020 (9 pages).
Samsung, "On Mode 1 for NR sidelink", 3GPP TSG RAN WG1 #100 e-Meeting R1-2000616, Feb. 24-Mar. 6, 2020 (9 pages).
LG Electronics, "Discussion on NR sidelink resource allocation for Mode 1", 3GPP TSG RAN WG1 #100 e- Meeting R1-2000782, Feb. 24-Mar. 6, 2020 (27 pages).
Ericsson, "Resource Allocation Mode 1 for NR SL", 3GPP TSG-RAN WG1 Meeting #100 e-Meeting, R1-2001008, Feb. 24-Mar. 6, 2020 (8 pages).
First Office Action of the Chinese application No. 202310111123.1, issued on Jun. 25, 2024. 20 pages with English translation.
First Office Action of the European application No. 20929569.0, issued on Dec. 19, 2023. 6 pages.
ITL: "Mode-1 resource allocation for NR V2X", 3GPP Draft; R1-1912367, 3rd Generation PartnershipProject (3GPP), Mobile Competence Centre ; 650, Route Deslucioles ; F-06921 Sophia-Antipolis Cedex; France, vol. RAN WG1, No. Reno, USA; Nov. 18, 2019-Nov. 22, 2019 Nov. 8, 2019 (Nov. 8, 2019), XP051820008, Retrieved from the Internet:URL:https://ftp.3gpp.org/tsg_ran/WG1_RL1/TSGR1_99/Docs/R1-1912367.zip R1-1912367_V2X_mode1.docx[retrieved on Nov. 8, 2019]. 5 pages.
ITL: "Physical layer procedure for NR V2X", 3GPP Draft; R1-1910797_V2X_PHY Procedure, 3rd GenerationPartnership Project (3GPP), Mobile Competence Centre ;650, Route Des Lucioles ; F-06921 Sophia-Antipolis Cedex ;France,vol. RAN WG1, No. Chongqing, China; Oct. 14, 2019-Oct. 20, 2019 Oct. 7, 2019 (Oct. 7, 2019), XP051808976,Retrieved from the Internet:URL:https://ftp.3gpp.org/tsg_ran/WG1_RL1/TSGR1_98b/Docs/R1-1910797.zip R1-1910797_V2X_PHYprocedure.docx. 6 pages.
NTT Docomo et al: "Remaining issues on resource allocation mechanism mode 1", 3GPP Draft; R1-2000915, 3rd Generation Partnership Project (3GPP), Mobilecompetence Centre ; 650, Route Des Lucioles ; F-06921 Sophia-Antipolis Cedex; France,vol. RAn WGI, No. e-Meeting; Feb. 24, 2020-Mar. 6, 2020 Feb. 14, 2020 (Feb. 14, 2020), XP051853094,Retrieved from the Internet:URL:https://ftp.3gpp.org/tsg_ran/WG1_RL1/TSGR1_100_e/Docs/R1-2000915.zip, R1-2000915_DCM_SL RA mode 1_fin.docx. 14 pages.
VIVO: "Discussion on mode 1 resource allocation mechanism", 3GPP Draft; R1-1911419, 3rd Generation Partnership Project (3GPP), Mobile Competence Centre; 650, Route Deslucioles; F-06921 Sophia-Antipolis Cedex ; Francevol. RAN WG1, No. Chongqing, China;Oct. 14, 2019-Oct. 2013 2019 Oct. 2019 (Oct. 13, 2019), XP051800859,Retrieved from the Internet: URL:https://ftp.3gpp.org/Meetings_3GPP_SYNC/RAN1/Docs/R1-1911419.zip R1-1911419.Doc[retrieved on Oct. 13, 2019]. 15 pages.
Supplementary European Search Report in the European application No. 20929569.0, mailed on Mar. 29, 2023. 9 pages.

* cited by examiner

200

| A terminal device acquires a time interval set, an element in the time interval set being used to determine a time interval between an SL feedback channel and a UL transmission channel | — S210 |

↓

| The terminal device acquires, according to a slot for the UL transmission channel and the time interval set, the SL feedback information carried by the UL transmission channel | — S220 |

| A network device sends a time interval set, an element in the time interval set being used to determine a time interval between an SL feedback channel and a UL transmission channel | — S310 |

↓

| The network device sends scheduling information, the scheduling information being used to determine a slot for the UL transmission channel | — S320 |

FIG. 10

SIDELINK FEEDBACK INFORMATION PROCESSING METHOD, TERMINAL DEVICE, AND NETWORK DEVICE

CROSS-REFERENCE TO RELATED APPLICATION

The disclosure is a continuation of International Application No. PCT/CN2020/083375 filed on Apr. 3, 2020, the disclosure of which is hereby incorporated by reference in its entirety.

BACKGROUND

Device to Device (D2D) communication is an SL-based transmission technology. Unlike a conventional cellular system where communication data is received or sent through a base Station (ST), a D2D system is higher in spectral efficiency and lower in transmission delay. A Vehicle to Everything (V2X) system uses D2D communication. In New Radio (NR)-V2X, a transmitter, after sending SL data to a receiver, may receive SL feedback information carried by an SL feedback channel, and then reports the SL feedback information to a network. The SL feedback information may indicate whether the SL data is correctly received. How to reduce transmission resources needed to report SL feedback information is a problem that needs to be solved.

SUMMARY

The disclosure relates to the field of communication, and more particularly to a Sidelink (SL) feedback information processing method, a terminal device, and a network device.

Embodiments of the disclosure provide an SL feedback information processing method, a terminal device, and a network device, which can reduce transmission resources needed to report SL feedback information.

The embodiments of the disclosure provide an SL feedback information processing method, which includes the following operations. A terminal device acquires a time interval set, an element in the time interval set being used to determine a time interval between an SL feedback channel and an Uplink (UL) transmission channel, and the UL transmission channel being used to carry SL feedback information reported by the terminal device to a network device. The terminal device determines, according to a slot for the UL transmission channel and the time interval set, the SL feedback information carried by the UL transmission channel.

The embodiments of the disclosure provide an SL feedback information processing method, which includes the following operations. A network device sends a time interval set, an element in the time interval set being used to determine a time interval between an SL feedback channel and a UL transmission channel, and the UL transmission channel being used to carry SL feedback information reported by a terminal device to the network device. The network device sends scheduling information, the scheduling information being used to determine a slot for the UL transmission channel.

The embodiments of the disclosure provide a terminal device, which includes a memory storing processor-executable instructions; and a processor. The processor is configured to execute the stored processor-executable instructions to perform operations of: acquiring a time interval set, an element in the time interval set being used to determine a time interval between a Sidelink (SL) feedback information and an Uplink (UL) transmission channel, and the UL transmission channel being used to carry SL feedback information reported by the terminal device to a network device; and determining, according to a slot for the UL transmission channel and the time interval set, the SL feedback information carried by the UL transmission channel.

The embodiments of the disclosure provide a network device, which includes a memory storing processor-executable instructions; and a processor. The processor is configured to execute the stored processor-executable instructions to perform an operation of: receiving Radio Resource Control (RRC) signaling, the RRC signaling comprising the time interval set.

BRIEF DESCRIPTION OF THE DRAWINGS

FIG. 9 is a schematic flowchart of an SL feedback information processing method according to an embodiment of the disclosure.

FIG. 10 is a schematic flowchart of an SL feedback information processing method according to another embodiment of the disclosure.

DETAILED DESCRIPTION

Figure 1:
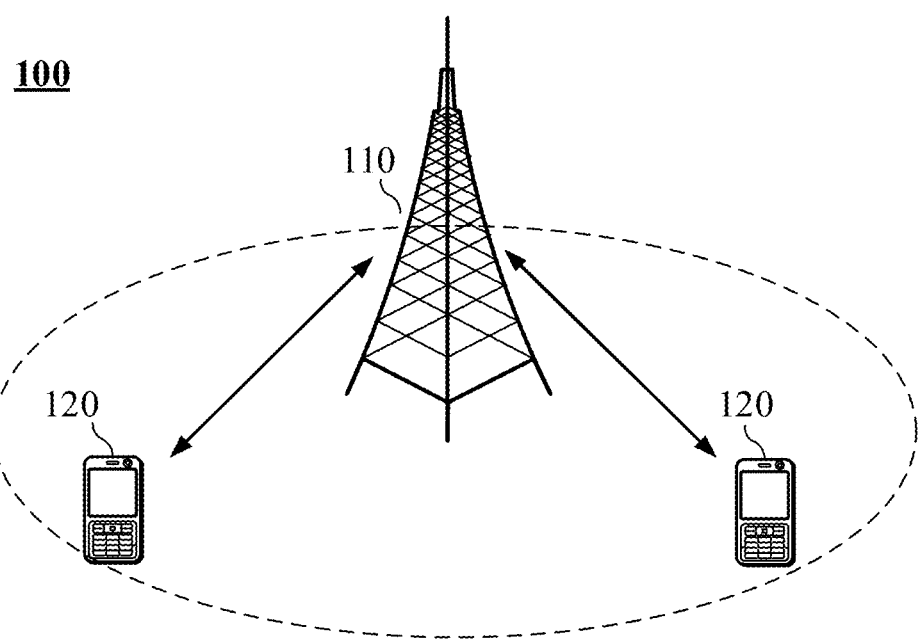
FIG. 1 is a schematic diagram of an application scenario according to an embodiment of the disclosure.

The technical solutions in the embodiments of the disclosure will be described below in combination with the drawings in the embodiments of the disclosure.

The technical solutions of the embodiments of the disclosure may be applied to various communication systems, for example: a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an NR system, an evolved system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation communication (5th-Generation (5G)) system, or another communication system.

Generally speaking, connections supported by a conventional communication system are usually limited in number and also easy to implement. However, with the development of communication technologies, a mobile communication system will not only support conventional communication but also support, for example, D2D communication, Machine to Machine (M2M) communication, Machine Type Communication (MTC), and Vehicle to Vehicle (V2V) communication. The embodiments of the disclosure may also be applied to these communication systems.

Optionally, a communication system in the embodiments of the disclosure may be applied to a Carrier Aggregation (CA) scenario, or a Dual Connectivity (DC) scenario, or a Standalone (SA) network deployment scenario.

An application spectrum is not limited in the embodiments of the disclosure. For example, the embodiments of the disclosure may be applied to a licensed spectrum or an unlicensed spectrum.

Each of the embodiments of the disclosure is described in combination with a network device and a terminal device. The terminal device may also be referred to as User Equipment (UE), an access terminal, a user unit, a user ST, a mobile ST, a mobile radio ST, a remote ST, a remote terminal, a mobile device, a user terminal, a terminal, a wireless communication device, a user agent, a user device, etc. The terminal device may be an ST in the WLAN, or may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, an onboard device, a wearable device, a terminal device in a next-generation communication system, for example, an NR network, a terminal device in a future evolved Public Land Mobile Network (PLMN), or the like.

As an example rather than restriction, in the embodiments of the disclosure, the terminal device may also be a wearable device. The wearable device, also referred to as a wearable intelligent device, is a generic term of wearable devices obtained by performing intelligentization designing and development on daily wearing products, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to application functions of a certain type and required to be matched with other devices such as intelligent phones for use.

The network device may be a device configured to communicate with a mobile device. The network device may be an Access Point (AP) in the WLAN and a Base Transceiver Station (BTS) in the GSM or CDMA, or may be a NodeB (NB) in WCDMA, or may be an Evolutional Node B (eNB or eNodeB) in LTE, or a relay ST or AP, or an onboard device, a wearable device, a network device (a gNB) in the NR network, a network device in the future evolved PLMN, or the like.

In the embodiments of the disclosure, the network device provides service for a cell, and the terminal device communicates with the network device through a transmission resource (for example, a frequency-domain resource or a spectrum resource) for the cell. The cell may be a cell corresponding to the network device (for example, a base ST). The cell may belong to a macro base ST or a base ST corresponding to a small cell. Here, the small cell may include: a metro cell, a micro cell, a pico cell, a femto cell and the like. These small cells have the characteristics of small coverage and low transmitted power and are suitable for providing high-rate data transmission service.

FIG. 1 exemplarily shows one network device 110 and two terminal devices 120. Optionally, the wireless communication system 100 may include multiple network devices 110, and there may be another number of terminal devices 120 in coverage of each network device 110. No limits are made thereto in the embodiments of the disclosure.

Optionally, the wireless communication system 100 may further include another network entity, such as a Mobility Management Entity (MME) and an Access and Mobility Management Function (AMF) entity. No limits are made thereto in the embodiments of the disclosure.

It is to be understood that terms "system" and "network" herein are usually interchangeable herein. As used herein, term "and/or" is only an association relationship describing associated objects, and represents that three relationships may exist. For example, A and/or B may represent three conditions: i.e., existence of only A, existence of both A and B, and existence of only B. In addition, character "/" herein usually represents that previous and next associated objects form an "or" relationship.

In the 3rd Generation Partnership Project (3GPP) protocol, there are two transmission modes in V2X: a first mode and a second mode.

Figure 2A:
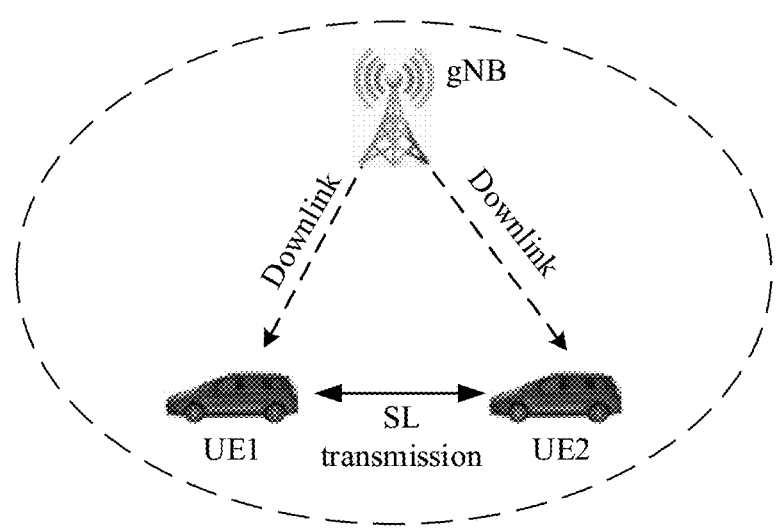
FIGS. 2A and 2B are schematic diagrams of transmission modes in V2X.

In the first mode, a transmission resource for a terminal is allocated by a network such as a gNB through a downlink, as shown in FIG. 2A. The terminal sends data on an SL according to the resource allocated by the gNB. The gNB may allocate a resource for single transmission to the terminal, or may allocate a resource for semi-persistent transmission to the terminal. This mode is also referred to as mode 3 in LTE-V2X.

Figure 2B:
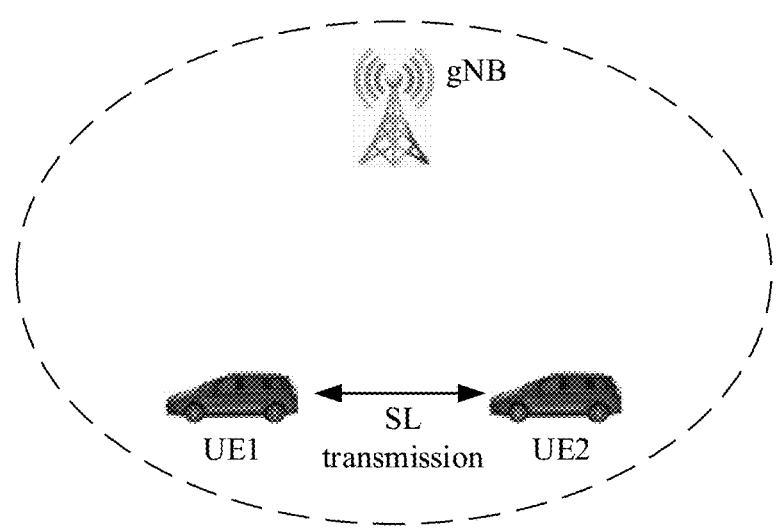

In the second mode, an onboard terminal selects a resource from a resource pool to transmit data. This mode is also referred to as mode 4 in LTE-V2X. As shown in FIG. 2B, the terminal may select a transmission resource by itself within the network. In addition, the terminal may also select a transmission resource by itself outside the network.

NR-V2X needs to support self-driving, and thus higher requirements, for example, higher throughput, lower delay, higher reliability, wider coverage, and more flexible resource allocation, are made to data interaction between vehicles.

Figure 3:
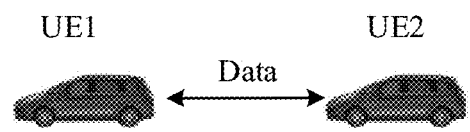
FIG. 3 is a schematic diagram of unicast transmission.
Figure 4:
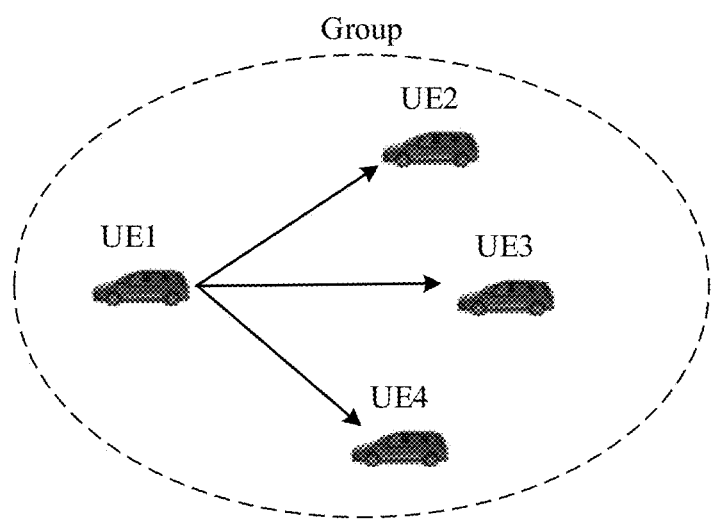
FIG. 4 is a schematic diagram of multicast transmission.
Figure 5:
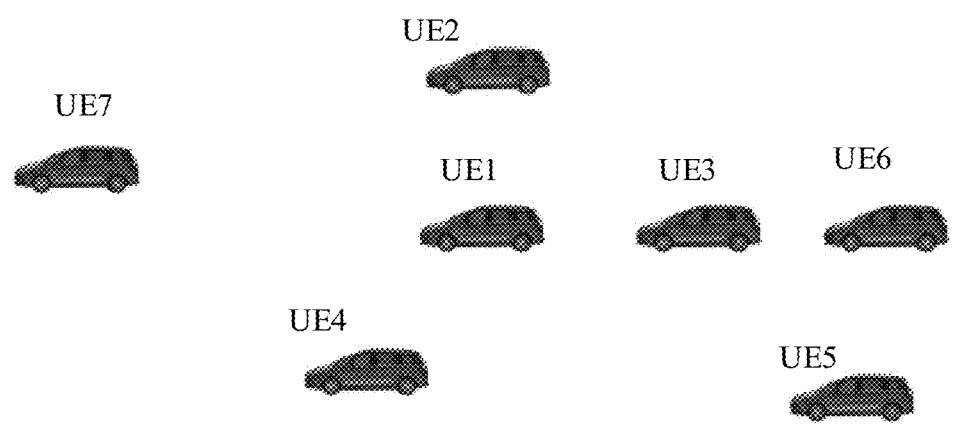
FIG. 5 is a schematic diagram of broadcast transmission.

LTE-V2X supports a broadcast transmission mode. Unicast and multicast transmission modes are introduced to NR-V2X. A receiver terminal (called receiver for short) of unicast transmission is only one terminal. As shown in FIG. 3, unicast transmission is performed between UE1 and UE2. A receiver of multicast transmission is all terminals in a communication group, or all terminals within a certain transmission distance. As shown in FIG. 4, UE1, UE2, UE3, and UE4 form a communication group, where UE1 sends data, and the other terminals in this group are receivers. A receiver of the broadcast transmission mode is any terminal. As shown in FIG. 5, UE1 is a transmitter terminal (called transmitter for short), and other terminals around are all receivers.

The following introduces SL Configured Grant (CG).

NR-V2X supports resource allocation of mode 1 and mode 2. In mode 2, the terminal selects a transmission resource by itself from a resource pool for SL transmission, i.e., the second mode. In mode 1, the network allocates an SL transmission resource to the terminal, i.e., the first mode. Specifically, the network may allocate the SL transmission resource to the terminal by dynamic scheduling. Alternatively, the network may allocate an SL CG transmission resource to the terminal. The CG resource allocation manner mainly includes two CG manners: type-1 CT and type-2 CG.

Type-1 CG: the network configures the SL transmission resource to the terminal through Radio Resource Control (RRC) signaling. Through the RRC signaling, all transmission resources and transmission parameters are configured, including a time-domain resource, a frequency-domain resource, a Demodulation Reference Signal (DMRS), a Modulation and Coding Scheme (MCS), etc. After receiving the high-layer parameter, the UE may perform SL transmission on the configured time-frequency resources by use of the configured transmission parameters.

Type-2 CG: a two-step resource configuration manner is used, i.e., an RRC and Downlink Control Information (DCI)-based manner. First, transmission resources and transmission parameters are configured by RRC signaling, including a period of a time-frequency resource, a redundancy version, a repeat count, the number of Hybrid Automatic Repeat reQuest (HARD) processes, etc. Then, type-2 CG transmission is activated by DCI, and other transmission resources and transmission parameters are configured at the same time, including a time-domain resource, a frequency-domain resource, etc. When receiving the RRC signaling, the UE may perform SL transmission not immediately by use of the resources and parameters configured by the high-layer parameter but after the corresponding DCI activation is received and the other resources and parameters are configured. In addition, the network may deactivate the configured transmission through DCI, and the terminal may no longer use the transmission resource for SL transmission after receiving the deactivation DCI.

If the network allocates a CG transmission resource to the terminal, the terminal, when having SL data to be transmitted, may directly use the transmission resource for transmission, and does not need to send a Scheduling Request (SR)/Buffer Status Reporting (BSR) to the network to request for the transmission resource, thereby reducing the delay.

Figure 6A:
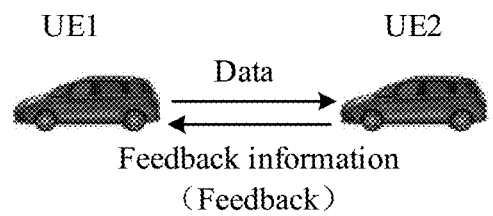
FIG. 6A is a schematic diagram of transmission between a transmitter and a receiver.

To improve the reliability, SL feedback channel is introduced to NR-V2X. For example, as shown in FIG. 6A, for unicast transmission, a transmitter sends SL data (for example, including a Physical Sidelink Control Channel (PSCCH) and a PSSCH) to a receiver. The receiver sends HARQ feedback information to the transmitter. The transmitter determines, according to the feedback information of the receiver, whether retransmission is needed. The HARQ feedback information is carried by an SL feedback channel, such as a Physical Sidelink Feedback Channel (PSFCH).

SL feedback may be activated or deactivated by pre-configuration information or network configuration information. If SL feedback is activated, the receiver receives the SL data sent by the transmitter, and feeds back HARQ Acknowledgment (ACK) or Negative Acknowledgment (NACK) to the transmitter according to a detection result. The transmitter determines to send data to be retransmitted or new data according to the feedback information of the receiver. If SL feedback is deactivated, the receiver does not need to send any feedback information. The transmitter usually sends data by blind retransmission. For example, the transmitter repeatedly sends each piece of SL data for K times rather than determines, according to the feedback information of the receiver, whether the data to be transmitted needs to be sent.

The terminal reports SL feedback information to the network in the following manner.

In mode 1, the network allocates an SL transmission resource to the terminal. If the transmitter transmits SL data supporting SL feedback by use of this resource, the receiver sends SL feedback information to the transmitter. The transmitter reports the SL feedback information to the network. The network determines, according to the SL feedback information reported by the transmitter, whether a retransmission resource needs to be allocated.

Specifically, the network may allocate a PUCCH resource to the terminal. The PUCCH transmission resource is used to carry the SL feedback information reported by the transmitter to the network.

Figure 6B:
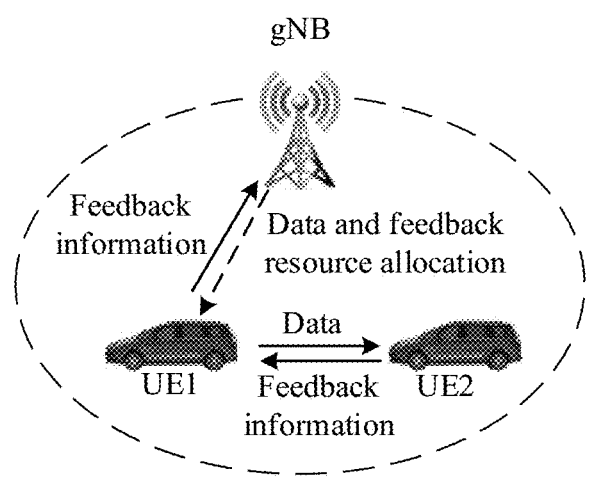
FIG. 6B is a schematic diagram of transmission between a network and a terminal.

As shown in FIG. 6B, for example, UE1 is Transmission (TX) UE, and UE2 is Reception (RX) UE. A gNB allocates an SL transmission resource to UE1, and allocates a PUCCH transmission resource. UE1 sends SL data PSCCH/PSSCH to UE2 on the SL transmission resource allocated by the gNB. UE2 sends SL feedback information to UE1 according to a detection result of the SL data (for example, sending HARQ-ACK on a PSFCH), the SL feedback information being used to indicate whether the SL data is correctly received. UE1 reports the SL feedback information to the network through the PUCCH. The network determines, according to the SL feedback information reported by UE1, whether a retransmission resource needs to be allocated to UE1.

Figure 7:
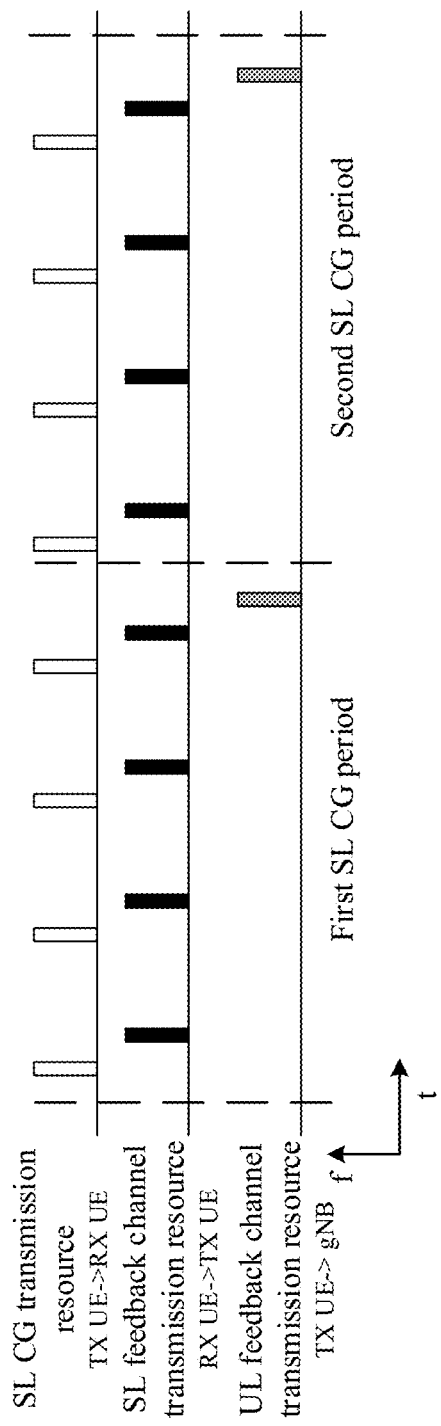
FIG. 7 is a schematic diagram of a relationship between SL and UL transmission resources.

For SL CG, there is only one PUCCH resource used for the terminal to report the SL feedback information to the network in a configured resource period. As shown in FIG. 7, for example, a period of each SL CG includes four SL transmission resources, four SL feedback transmission resources, and one PUCCH resource. The PUCCH resource is after the last SL feedback resource. The TX UE reports SL feedback information only once to the network, for example, reporting 1-bit HARQ-ACK information only, in a period of one SL CG to indicate whether SL data transmitted in this period is correctly received by the receiver.

Figure 8:
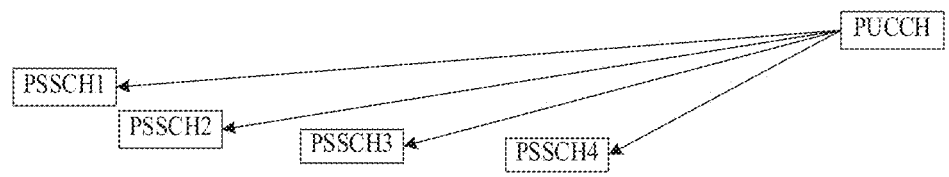
FIG. 8 is a schematic diagram of reporting Physical Sidelink Shared Channels (PSSCHs) through a Physical Uplink Control Channel (PUCCH).

To reduce the PUCCH resource overhead, the network, when allocating SL transmission resources to the terminal, may allocate the same PUCCH resource for reporting SL feedback information in multiple SL transmissions. As shown in FIG. 8, for example, the network allocates a first SL resource for transmission of PUSSCH1 and a corresponding PUCCH to the terminal through DCI, and allocates a second SL resource for transmission of PSSCH2 to the terminal, a UL transmission resource corresponding to PSCCH2 being also the PUCCH. By parity of reasoning, SL feedback information corresponding to four PSSCHs is reported through the same PUCCH. Therefore, the terminal may report SL feedback information corresponding to multiple PSSCHs through one PUCCH.

FIG. 9 is a schematic flowchart of an SL feedback information processing method 200 according to an embodiment of the disclosure. The method may optionally be applied, but not limited, to the system shown in FIG. 1. The method includes at least part of the following contents.

In S210, a terminal device acquires a time interval set, an element in the time interval set being used to determine a time interval between an SL feedback channel and a UL transmission channel, and the UL transmission channel being used to carry SL feedback information reported by the terminal device to a network device.

In S220, the terminal device acquires, according to a slot for the UL transmission channel and the time interval set, the SL feedback information carried by the UL transmission channel.

Optionally, in the embodiment of the disclosure, the time interval set includes at least one time interval.

Optionally, in the embodiment of the disclosure, the time interval set may include one or more elements, each of which may represent a time interval.

Optionally, in the embodiment of the disclosure, the element in the time interval set may be a number of slots. Exemplarily, if the element is 3, it may indicate that the time interval between the SL feedback channel and the UL transmission channel is three slots. The time interval set may include one or more elements. For example, the element in the time interval set may be 3, or {3, 5}, or {2, 6, 10}, etc. In addition, the element in the time interval set may also represent a time length, such as a number of milliseconds, or a number of time-domain symbols or a number of other time units.

The terminal device may determine the time interval between the SL feedback channel and the UL transmission channel according to the element in the time interval set, and determine, according to the slot for the UL transmission channel and each time interval in the time interval set, a slot where the SL feedback channel is located. Further, a slot for an SL data channel corresponding to the slot for the SL feedback channel is determined according to the slot for the SL feedback channel. Each SL data channel corresponds to one or more pieces of SL feedback information. Therefore, the SL feedback information that is carried by the UL transmission channel and needs to be reported to the network device may be acquired. A slot where an SL feedback channel is located may include multiple SL feedback channels, of which each includes one or more pieces of SL feedback information, thus multiple pieces of SL feedback information may be transmitted through one UL transmission channel, thereby reducing required UL transmission channel resources.

Optionally, in the embodiment of the disclosure, the UL transmission channel is a PUCCH or a Physical Uplink Shared Channel (PUSCH).

Optionally, in the embodiment of the disclosure, the SL feedback channel is a PSFCH.

Optionally, in the embodiment of the disclosure, the element in the time interval set may be used to determine a time interval between the PSFCH and the PUCCH or PUSCH.

Optionally, in the embodiment of the disclosure, the operation that the terminal device acquires, according to a slot for the UL transmission channel and the time interval set, the SL feedback information carried by the UL transmission channel includes the following operations.

The terminal device determines, according to the slot for the UL transmission channel and a time interval in the time interval set, an SL slot where the SL feedback channel is located.

The terminal device acquires, according to the SL slot where the SL feedback channel is located, the SL feedback information carried by the UL transmission channel.

In an SL, one SL transmission may correspond to one piece of SL feedback information. SL feedback information corresponding to multiple SL transmissions may be fed back in the same slot, and this slot is a slot where the SL feedback channel is located. In this slot, multiple SL feedback channels may be transmitted, and one SL feedback channel may carry one or more pieces of SL feedback information. An SL slot where the SL feedback channel is located in the SL may be determined according to the slot for the UL transmission channel in the UL and the element in the time interval set. For example, if the time interval set includes only one element, an SL slot where one PSFCH is located may be obtained according to this element. If the time interval set includes M elements, SL slots where M PSFCHs are located may be obtained according to the M elements.

According to the SL slot where the SL feedback channel is located, the corresponding SL transmission may be acquired. Each SL transmission corresponds to one or more SL pieces of feedback information. Then, the acquired SL feedback information may be carried by the UL transmission channel, and the UL transmission channel is reported to the network. For example, according to an SL slot where a PSFCH is located, a slot of one or more SL data transmissions corresponding to the SL slot may be acquired, and SL feedback information corresponding to the one or more SL data transmissions may further be acquired. Then, the acquired SL feedback information may be carried by a PUCCH or a PUSCH, and the PUCCH or the PUSCH is reported to the network.

Optionally, in the embodiment of the disclosure, a number of slots represented by the element in the time interval set is determined based on a size of at least one of a UL subcarrier or an SL subcarrier.

Optionally, in the embodiment of the disclosure, the operation that the terminal device determines, according to the slot for the UL transmission channel and a time interval in the time interval set, an SL slot where the SL feedback channel is located includes the following operation.

For each time interval in the time interval set, the terminal device determines the SL slot where the SL feedback channel is located by subtracting the time interval from an index of the slot for the UL transmission channel.

If a UL subcarrier is as large as an SL subcarrier, indexes of UL and SL slots are in one-to-one correspondence. An index of an UL slot can be obtained by subtracting each time interval in the time interval set from an index of the slot for the UL transmission channel. An index of an SL slot corresponding to the index of the UL slot may be determined according to a corresponding relationship between an index of a UL slot and an index of an SL slot. The SL slot represented by the index of the SL slot may be the SL slot where the SL feedback channel is located.

For example, the time interval set includes {n1, n2}, n1 and n2 representing numbers of slots. In such case, if the index of the slot for the UL transmission channel is n, it may be calculated that an index of one UL slot is n-n1, the UL slot corresponding to an SL slot k1, and an index of the other UL slot is n-n2, the UL slot corresponding to an SL slot k2. n1 and n2 may be positive integers more than or equal to 1, and n may be a positive integer greater than n1 and n2. If n2 is greater than n1, n2-n1 may be an integral multiple of a period N of the SL feedback channel of the SL, namely a difference between elements in the time interval set is an integral multiple of the period N of the SL feedback channel.

Optionally, in the embodiment of the disclosure, the operation that the terminal device determines, according to the slot for the UL transmission channel and a time interval in the time interval set, an SL slot where the SL feedback channel is located includes the following operations.

For each time interval in the time interval set, the terminal device obtains an index of an UL slot by subtracting the time interval from an index of the slot for the UL transmission channel.

The SL slot where the SL feedback channel is located is determined according to the index of the UL slot.

If a UL subcarrier is different from an SL subcarrier in size, indexes of UL and SL slots are not in one-to-one correspondence. For example, multiple SL slots correspond to one UL slot. An index of an UL slot can be obtained by subtracting each time interval in the time interval set from an index of the slot for the UL transmission channel. Indexes of multiple corresponding SL slots may be obtained according to the index of the UL slot. The SL slot where the SL feedback channel is located may be determined from the SL slots represented by the indexes of the SL slots.

For example, the time interval set includes {n1, n2}, n1 and n2 representing numbers of slots. In such case, if the index of the slot for the UL transmission channel is n, it may be calculated that an index of one UL slot is n-n1 and an index of the other UL slot is n-n2. n1 and n2 may be positive integers more than or equal to 1, and n may be a positive integer greater than n1 and n2. If n2 is greater than n1, n2-n1 may be an integral multiple of a period N of the SL feedback channel of the SL. The UL slot corresponding to n-n1 corresponds to m1 SL slots. The SL slot where the SL feedback channel is located may be determined from the m1 SL slots. The m1 SL slots may include SL slots where one or more SL feedback channels are located. Similarly, the UL slot corresponding to n-n2 corresponds to m2 SL slots. The SL slot where the SL feedback channel is located may be determined from the m2 SL slots. The m2 SL slots may include SL slots where one or more SL feedback channels are located.

Optionally, in the embodiment of the disclosure, the method further includes that: the terminal device reports the SL feedback information through the UL transmission channel in the slot for the UL transmission channel. Specifically, the terminal device may send the UL transmission channel to the network device in the slot for the UL transmission channel, the UL transmission channel carrying the SL feedback information acquired according to the above-mentioned method. For example, the terminal device sends a PUSCH or Physical Downlink Control Channel (PDCCH) to the network device, the PUSCH or the PDCCH including multiple pieces of SL feedback information.

Optionally, in the embodiment of the disclosure, the method further includes that: the terminal device determines, according to a number of elements in the time interval set, a total number of HARQ information fields of the SL feedback information carried by the UL transmission channel. For example, the number of elements in the time interval set is M, and slots of M SL feedback channels are determined according to the M elements. If the slot for each SL feedback channel includes one piece of SL feedback information, the total number of HARQ information fields of the SL feedback information carried by the UL transmission channel is M.

Optionally, in the embodiment of the disclosure, one HARQ information field corresponds to one bit. If the total number of HARQ information fields of the SL feedback information carried by the UL transmission channel is M, it may indicate that the SL feedback information carried by the UL transmission channel is M bits.

Optionally, in the embodiment of the disclosure, the method further includes that: the terminal device determines, according to a period of the SL feedback channel and a number of elements in the time interval set, a total number of HARQ information fields of the SL feedback information carried by the UL transmission channel. For example, the number of elements in the time interval set is M, and slots of M SL feedback channels are determined according to the M elements. If the period of the SL feedback channel is N, namely every N slots include a slot for one SL feedback channel, the total number of HARQ information fields of the SL feedback information carried by the UL transmission channel is M*N.

Optionally, in the embodiment of the disclosure, the method further includes that: the terminal device determines, according to a period of the SL feedback channel, a number of elements in the time interval set, an SL Subcarrier Spacing (SCS), and a UL SCS, a total number of HARQ information fields of the SL feedback information carried by the UL transmission channel. For example, the number of elements in the time interval set is M, and slots of M SL feedback channels are determined according to the M elements. If the period of the SL feedback channel is N, namely every N slots include a slot for one SL feedback channel, and the SL SCS is K times the UL SCS, namely one UL slot corresponds to K SL slots, the total number of HARQ information fields of the SL feedback information carried by the UL transmission channel is M*K/N.

Optionally, in the embodiment of the disclosure, the operation that the terminal device determines, according to a period of the SL feedback channel and a number of elements in the time interval set, a total number of HARQ information fields of the SL feedback information carried by the UL transmission channel includes the following operations.

The terminal device determines, according to a period of a PSFCH, a number of PSSCH slots associated with one PSFCH slot.

The terminal device determines, according to the number of elements in the time interval set and the number of PSSCH slots associated with one PSFCH slot, a total number of HARQ information fields of the SL feedback information carried by the UL transmission channel.

For example, the period of the PSFCH is N, and the number of PSSCH slots associated with one PSFCH is also N. If each PSSCH slot corresponds to one piece of SL feedback information, the amount of SL feedback information corresponding to the N PSSCH slots is N. Moreover, each piece of SL feedback information corresponds to one HARQ information field carried by the UL transmission channel.

Optionally, in the embodiment of the disclosure, each PSSCH slot corresponds to one HARQ information field in the UL transmission channel. For example, a piece of SL feedback information corresponding to a PSSCH slot is HARQ-ACK, and the HARQ-ACK may occupy one HARQ information field in the UL transmission channel.

Optionally, in the embodiment of the disclosure, each PSFCH slot corresponds to one HARQ information field in the UL transmission channel. For example, each PSFCH slot is associated with N PSSCH slots, each of which corresponds to one piece of SL feedback information, and one piece of SL feedback information may be selected from the SL feedback information corresponding to these PSSCH slots, which occupies one HARQ information field in the UL transmission channel.

Optionally, in the embodiment of the disclosure, each PSFCH slot is associated with N PSSCH slots, and the HARQ information field corresponding to the PSFCH slot in the UL transmission channel carries SL feedback information corresponding to a PSCCH with a highest priority in the N PSSCH slots. For example, the N PSSCH slots have different priorities, and the SL feedback information corresponding to the PSSCH with the highest priority is selected, which occupies one HARQ information field in the UL transmission channel.

Optionally, in the embodiment of the disclosure, each PSFCH slot is associated with N PSSCH slots, and the HARQ information field corresponding to the PSFCH slot in the UL transmission channel carries SL feedback information corresponding to a last sent PSSCH in the N PSSCH slots. For example, sending sequences of the N PSSCH slots are different, and the SL feedback information corresponding to the last sent PSSCH is selected, which occupies one HARQ information field in the UL transmission channel.

Optionally, in the embodiment of the disclosure, each PSFCH slot is associated with N PSSCH slots, and the HARQ information field corresponding to the PSFCH slot in the UL transmission channel carries SL feedback information corresponding to a bit AND operation performed on SL feedback information corresponding to all PSSCHs sent in the N PSSCH slots. For example, the N PSSCH slots correspond to N pieces of SL feedback information, and a bit AND operation is performed on the N pieces of SL feedback information to obtain a piece of SL feedback information. The SL feedback information obtained by the bit AND operation is carried by the UL transmission channel through a HARQ information field. If the N pieces of SL feedback information are all ACK, the SL feedback information obtained by the bit AND operation is ACK. If one of the N pieces of SL feedback information is NACK, the SL feedback information obtained by the bit AND operation is NACK. If the transmitter sends a PSSCH but does not receive SL feedback information corresponding to the PSSCH, the SL feedback information corresponding to the PSSCH is set to NACK during the bit AND operation.

Optionally, in the embodiment of the disclosure, the method further includes that: in a case where no PSSCH is sent in one of the N PSSCH slots, the SL feedback information corresponding to the slot where no PSSCH is sent is set to be ACK during the bit AND operation. For example, N is 4, SL feedback information corresponding to three of the four PSSCH slots is ACK, ACK, and ACK respectively, and no PSSCH is sent in the other slot. SL feedback information corresponding to the slot where no PSSCH is sent is set to be ACK. SL feedback information obtained by a bit AND operation is ACK.

For another example, N is 6, SL feedback information corresponding to three of the six PSSCH slots is ACK, NACK, and NACK respectively, and no PSSCH is sent in the other three slots. In such case, SL feedback information corresponding to the three slots where no PSSCH is sent is set to be ACK. SL feedback information obtained by a bit AND operation is NACK.

For another example, N is 4, PSSCHs are sent in three of the four PSSCH slots, SL feedback information corresponding to the three slots is ACK, NACK, and NACK respectively, and no PSSCH is sent in the other slot. In such case, SL feedback information obtained by performing a bit AND operation on the SL feedback information corresponding to the three slots is NACK.

Optionally, in the embodiment of the disclosure, in a case where same SL data is transmitted in multiple PSSCH slots associated with the UL transmission channel, HARQ information fields corresponding to the multiple PSSCH slots in the UL transmission channel are in a same HARQ state.

For example, the same SL data is transmitted in three PSSCH slots, and SL feedback information corresponding to the three PSSCH slots is NACK, ACK, and ACK respectively. HARQ states of HARQ information fields corresponding to the three PSSCH slots in the UL transmission channel may all be set to be ACK.

Optionally, in the embodiment of the disclosure, the SL feedback information carried by the UL transmission channel is a HARQ-ACK codebook carried by the PUCCH or the PUSCH.

Optionally, in the embodiment of the disclosure, the slot for the UL transmission channel is determined based on the time interval and a slot for the UL feedback channel. For example, the slot for the UL transmission channel is the slot for the SL feedback channel plus the time interval in the time interval set. Therefore, the network allocates the slot for the UL transmission channel according to the time interval in the time interval set and the slot where the SL feedback channel is located. Optionally, in the embodiment of the disclosure, the method further includes that: the terminal device receives RRC signaling or a System Information Block (SIB), the RRC signaling or the SIB including the time interval set.

Optionally, in the embodiment of the disclosure, the method further includes that: the time interval set is pre-configured in the terminal device.

In the embodiment of the disclosure, the SL feedback information carried by the UL transmission channel may be acquired according to the time interval between the SL feedback channel and the UL transmission channel in the time interval set and the slot for the UL transmission channel, and the SL feedback information is reported through one UL transmission channel, so that transmission resources needed to report the SL feedback information are reduced.

FIG. 10 is a schematic flowchart of an SL feedback information processing method 300 according to an embodiment of the disclosure. The method may optionally be applied, but not limited, to the system shown in FIG. 1. The method includes at least part of the following contents.

In S310, a network device sends a time interval set, an element in the time interval set being used to determine a time interval between an SL feedback channel and a UL transmission channel, and the UL transmission channel being used to carry SL feedback information reported by a terminal device to the network device.

In S320, the network device sends scheduling information, the scheduling information being used to determine a slot for the UL transmission channel.

Optionally, in the embodiment of the disclosure, the method further includes that: the network device sends RRC signaling or a SIB, the RRC signaling or the SIB including the time interval set.

Optionally, in the embodiment of the disclosure, the method further includes that: the network device receives the UL transmission channel in the slot for the UL transmission channel, the UL transmission channel including the SL feedback information.

Optionally, in the embodiment of the disclosure, the time interval set includes at least one time interval.

Optionally, in the embodiment of the disclosure, the method further includes that: the network device determines, according to a number of elements in the time interval set, a total number of HARQ information fields of the SL feedback information carried by the UL transmission channel.

Optionally, in the embodiment of the disclosure, the method further includes that: the network device determines, according to a period of the SL feedback channel and a number of elements in the time interval set, a total number of HARQ information fields of the SL feedback information carried by the UL transmission channel.

Optionally, in the embodiment of the disclosure, the operation that the network device determines, according to a period of the SL feedback channel and a number of elements in the time interval set, a total number of HARQ information fields of the SL feedback information carried by the UL transmission channel includes the following operations.

The network device determines, according to a period of a PSFCH, a number of PSSCH slots associated with one PSFCH slot.

The network device determines, according to the number of elements in the time interval set and the number of PSSCH slots associated with one PSFCH slot, a total number of HARQ information fields of the SL feedback information carried by the UL transmission channel.

Optionally, in the embodiment of the disclosure, each PSSCH slot corresponds to one HARQ information field in the UL transmission channel.

Optionally, in the embodiment of the disclosure, each PSFCH slot corresponds to one HARQ information field in the UL transmission channel.

Optionally, in the embodiment of the disclosure, each PSFCH slot is associated with N PSSCH slots, and the HARQ information field corresponding to the PSFCH slot in the UL transmission channel carries SL feedback information corresponding to a PSCCH with a highest priority in the N PSSCH slots.

Optionally, in the embodiment of the disclosure, each PSFCH slot is associated with N PSSCH slots, and the HARQ information field corresponding to the PSFCH slot in the UL transmission channel carries SL feedback information corresponding to a last sent PSSCH in the N PSSCH slots.

Optionally, in the embodiment of the disclosure, each PSFCH slot is associated with N PSSCH slots, and the HARQ information field corresponding to the PSFCH slot in the UL transmission channel carries SL feedback information corresponding to a bit AND operation performed on SL feedback information corresponding to all PSSCHs sent in the N PSSCH slots.

Optionally, in the embodiment of the disclosure, the method further includes that: in a case where no PSSCH is sent in one of the N PSSCH slots, the SL feedback information corresponding to the slot where no PSSCH is sent is set to be ACK during the bit AND operation.

Optionally, in the embodiment of the disclosure, one HARQ information field corresponds to one bit.

Optionally, in the embodiment of the disclosure, in a case where same SL data is transmitted in multiple PSSCH slots associated with the UL transmission channel, HARQ information fields corresponding to the multiple PSSCH slots in the UL transmission channel are in a same HARQ state.

Optionally, in the embodiment of the disclosure, a number of slots represented by the element in the time interval set is determined based on a size of at least one of a UL subcarrier or an SL subcarrier.

Optionally, in the embodiment of the disclosure, the UL transmission channel is a PUCCH or a PUSCH.

Optionally, in the embodiment of the disclosure, the SL feedback information carried by the UL transmission channel is a HARQ-ACK codebook carried by the PUCCH or the PUSCH.

Optionally, in the embodiment of the disclosure, the slot for the UL transmission channel is determined based on the time interval and a slot for the UL feedback channel.

Specific examples of execution of the method 300 by the network device in the embodiment may refer to the related descriptions about the network device, such as a base ST, in the method 200, and for brevity, will not be elaborated herein.

An embodiment of the disclosure may provide a semi-persistent HARQ-ACK codebook design. Multiple pieces of SL feedback information may be configured by network configuration information or pre-configuration to be reported to a network through a PUCCH (or PUSCH). A corresponding relationship between an SL transmission resource and a transmission resource of a PUCCH (or PUSCH) may be configured semi-persistently.

Embodiment 1: a PUCCH is multiplexed for SL feedback information corresponding to multiple SL transmissions. The embodiment includes the following features.

Feature 1: the network configures or pre-configures a time interval set. An element in the set may represent a slot offset between a slot where a PSFCH is located and a slot where the PUCCH is located. For example, the slot offset is represented by K1. The slot offset is determined according to a UL subcarrier. Alternatively, the slot offset represents a number of UL slots.

Feature 2: a number of HARQ information fields in the PUCCH may be determined according to a number of elements in the set.

For example, if the set includes four element values, i.e., four candidate K1 values, the number M of HARQ information fields in the PUCCH is determined according to the number 4 of elements. For example, the number M of HARQ information fields is 4. Alternatively, M=4*N. N represents a period parameter of a time-domain resource of the PSFCH.

Feature 3: a time-domain period of the PSFCH is N slots. Every N slots includes one PSFCH slots. SL feedback information corresponding to each PSSCH in the N slots is transmitted in this PSFCH slot. The SL feedback information corresponding to the N slots may be reported to the network through the PUCCH in the following manners.

In a first manner, each PSSCH slot corresponds to one HARQ information field of the PUCCH.

In a second manner, each PSFCH slot corresponds to one HARQ information field of the PUCCH. Each PSFCH slot is associated with multiple PSSCH slots. For example, one PSFCH slot is associated with N PSSCH slots. Optionally, a terminal selects, according to priorities of PSSCHs sent in the N slots, the SL feedback information corresponding to the PSSCH with a highest priority for reporting. Alternatively, the terminal selects, according to sending sequences of PSSCHs sent in the N slots, the SL feedback information corresponding to the last sent PSSCH for reporting. Alternatively, the terminal binds the SL feedback information corresponding to PSSCHs sent in the N slots for reporting. A binding operation may include performing a bit AND operation on the SL feedback information corresponding to the PSSCHs sent in the N slots. If one piece of SL feedback information is HARQ-ACK information, the bit AND operation may be performed on N pieces of HARQ-ACK information.

Figure 11:
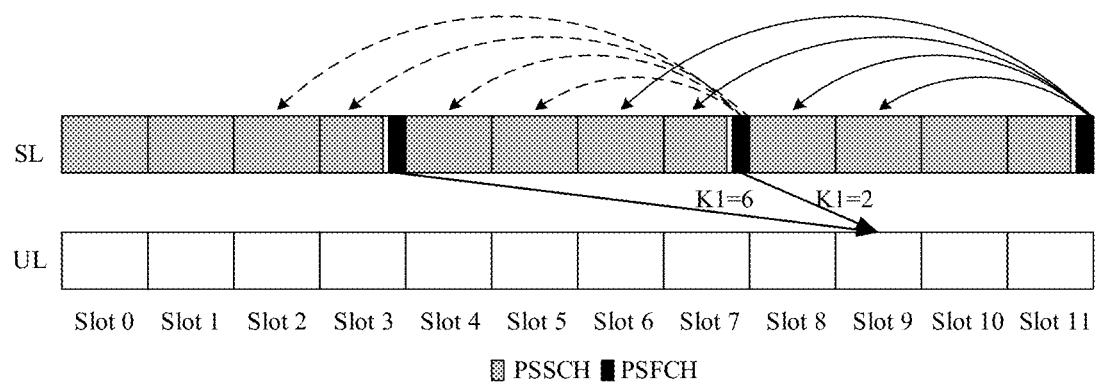
FIG. 11 is an exemplary diagram of reporting SL feedback information corresponding to multiple PSSCHs through one PUCCH.

For example, as shown in FIG. 11, the period N of the PSFCH is four slots, namely every four slots include one PSFCH slot, and PSFCHs corresponding to PSSCH transmissions of every four slots are transmitted in the same slot. As shown by the dashed arrow in FIG. 11, PSFCHs corresponding to slots 2, 3, 4, and 5 are all transmitted in slot 7. A slot spacing set between the PSFCH and the PUCCH is {2, 6}. The network schedules the SL transmission of slot 4, and indicates that a slot spacing K1 between the PSFCH and the PUCCH is 2. Since a PSSCH is transmitted in SL slot 4, the PSFCH corresponding to the PSSCH is in slot 7, and the slot spacing K1 between the PSFCH and the PUCCH is 2, a slot where the PUCCH is located is slot 9 (slot 7 plus the time spacing 2). Element 6 in the set represents that the slot spacing K1 is 6. According to this slot spacing, it may be determined that SL feedback information in the PSFCH in slot 3 (slot 9 minus the slot spacing 6) is also reported to the network through the PUCCH.

Since the network may schedule the terminal to send SL data in slots 2, 3, 4, and 5 respectively, there may be corresponding SL feedback information that needs to be reported in these SL slots. If slots 2, 3, 4, and 5 correspond to the same SL feedback slot, multiple PSFCHs may be transmitted in this slot. For example, four PSFCHs are transmitted. The PSFCHs include one bit each, and correspond to SL feedback information of PSSCHs corresponding to slots 2, 3, 4, and 5. The SL feedback information corresponding to the four SL PSSCHs may be reported through the PUCCH. Therefore, four HARQ-ACK information fields may be set in the PUCCH to report the SL feedback information of the four slots respectively. For each SL slot, there is in the PUCCH a corresponding HARQ-ACK information field for carrying the SL feedback information corresponding to the PSSCH of this SL slot.

The number of HARQ-ACK information fields carried by one PUCCH may be determined in the following manner.

The slot where the PUCCH is located is slot n. A slot where the PSFCH corresponding to slot n is located is determined according to a value of the element in the set. In the above example, the slot where the PUCCH is located is n=9, and it is determined according to the set {2, 6} that the slot where the PSFCH is located includes SL slot 3 (slot 0 minus the slot spacing 6) and slot 7 (slot 9 minus the slot spacing 2).

A number of PSSCH slots associated with one PSFCH slot is determined according to the period N of the PSFCH. Each PSSCH slot corresponds to one HARQ information field of the PUCCH. In the above example, N is 4, and then the PUCCH includes eight (N times the number of elements in the time interval set) HARQ-ACK information fields.

Further, a total number of bits of the SL feedback information carried by the PUCCH is determined according to a number of bits of the SL feedback information corresponding to each PSSCH. For example, if one PSSCH corresponds to 1-bit SL feedback information, the PUCCH in the above example includes 8-bit SL feedback information.

Figure 12:
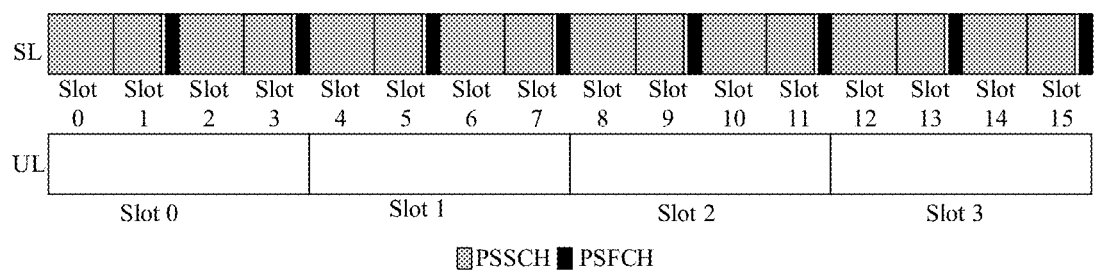
FIG. 12 is another exemplary diagram of reporting SL feedback information corresponding to multiple PSSCHs through one PUCCH.

Further, the number of HARQ-ACK information fields in the PUCCH is related to sizes of a UL subcarrier and an SL subcarrier. In FIG. 11, UL and SL SCSs are the same. In FIG. 12, UL and SL SCSs are different. For example, the UL SCS is 15 kHz, and the SL SCS is 60 kHz. That is, a UL slot corresponds to a length of four SL slots. The period N of the PSFCH is 2, and the slot spacing set between the PSFCH and the PUCCH is {1, 2}.

If the network schedules SL transmission, and SL feedback information corresponding to the SL transmission is reported through a PUCCH in UL slot 3, HARQ-ACK codebook information in the PUCCH is determined as follows.

The set includes elements {1, 2}. A number of slots represented by the element is determined based on the UL slot. UL slot 2 (slot 3 minus slot spacing 1) is obtained according to element 1 in the set. SL slots (SL slots 8, 9, 10, and 11) corresponding to UL slot 2 include two PSFCH slots (SL slot 9 and SL slot 11). A PSFCH in SL slot 9 corresponds to SL feedback of PSSCHs in SL slots 6 and 7, and a PSFCH in SL slot 11 corresponds to SL feedback of PSSCHs in SL slots 8 and 9. Therefore, the PUCCH includes four HARQ-ACK information fields, the first two bits correspond to SL feedback information corresponding to SL slots 6 and 7, and the last two bits correspond to SL feedback information corresponding to SL slots 8 and 9. Similarly, UL slot 1 (slot 3 minus slot spacing 2) is obtained according to element 2 in the set. SL slots (SL slots 4, 5, 6, and 7) corresponding to UL slot 1 include two PSFCH slots (SL slot 5 and SL slot 7). A PSFCH in SL slot 5 corresponds to SL feedback of PSSCHs in SL slots 2 and 3, and a PSFCH in SL slot 7 corresponds to SL feedback of PSSCHs in SL slots 4 and 5. Therefore, the PUCCH includes other four HARQ-ACK information fields, the first two bits correspond to SL feedback information corresponding to SL slots 2 and 3, and the last two bits correspond to SL feedback information corresponding to SL slots 4 and 5. Therefore, the PUCCH includes totally eight HARQ-ACK information fields that correspond to SL feedback information corresponding to SL slot 2 to SL slot 9 respectively.

Feature 4: if the same SL data is transmitted through multiple PSSCHs scheduled by the network, HARQ-ACK information fields corresponding to transmission of the multiple PSSCHs in the PUCCH are set to the same HARQ state.

For example, referring to FIG. 11, the network schedules transmission resources on SL slots 2 and 3 for TX UE through DCI, and indicates that the slot spacing between the PSFCH and the PUCCH is 2. The TX UE determines according to slots 2 and 3 that corresponding PSFCHs are in slot 7, and thus may determine that the slot where the PUCCH is located is slot 9. The TX UE performs first transmission and retransmission of SL data on slots 2 and 3. RX UE sends SL feedback information ACK (or (NACK) to the TX UE. The TX UE sets two HARQ-ACK information fields corresponding to SL slots 2 and 3 in the PUCCH to ACK (or NACK).

In addition, in each of the above-mentioned embodiments, the terminal determines, according to a last PSFCH resource corresponding to multiple PSSCH resources scheduled by the network, the slot where the PUCCH is located.

For example, referring to FIG. 11, the network schedules SL transmission resources of slot 2 and slot 8 in the SL, and indicates that the slot spacing between the PSFCH and the PUCCH is 2. A slot for a PSFCH corresponding to a PSSCH in slot 2 is slot 7. A slot for a PSFCH corresponding to a PSSCH in slot 8 is slot 11. The terminal determines, according to the PSFCH in slot 11, a slot where a transmission resource of a PUCCH is located is slot 13 (slot 11 of the last PSFCH plus the slot spacing 2).

Further, for dynamic scheduling resource allocation, an SL transmission resource and a slot spacing between a PSFCH and a PUCCH may be indicated in DCI. A slot where a last corresponding PSFCH is located is determined according to the SL transmission resource. A slot for a PUCCH is determined according to the slot spacing. Then, a HARQ-ACK codebook carried by the PUCCH is determined according to all values of K1 in the time interval set configured by the network. For type-1 (or type-2) SL CG, an SL transmission resource is configured according to RRC signaling (or DCI), and a time interval between a PSFCH and a PUCCH is indicated in the RRC signaling (or the DCI). The terminal determines a slot for a last corresponding PSFCH according to the SL transmission resource in each SL CG period, determines a slot for a PUCCH according to the time interval, and then determines a HARQ-ACK codebook carried by the PUCCH according to all values of K1 in the timing parameter set configured by the network.

By the semi-persistent HARQ-ACK codebook determination method, SL feedback information corresponding to multiple SL slots may be reported to the network through one PUCCH, reducing the PUCCH resource overhead.

Figure 13:
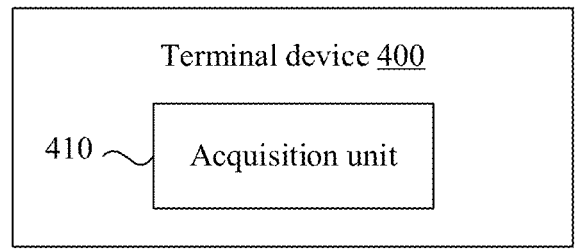
FIG. 13 is a schematic block diagram of a terminal device according to an embodiment of the disclosure.

FIG. 13 is a schematic block diagram of a terminal device 400 according to an embodiment of the disclosure. The terminal device 400 may include an acquisition unit 410.

The acquisition unit 410 is configured to acquire a time interval set, an element in the time interval set being used to determine a time interval between an SL feedback channel and a UL transmission channel, and the UL transmission channel being used to carry SL feedback information reported by the terminal device to a network device.

The acquisition unit 410 is further configured to acquire, according to a slot for the UL transmission channel and the time interval set, the SL feedback information carried by the UL transmission channel.

Optionally, in the embodiment of the disclosure, the acquisition unit 410 is specifically configured to acquire, according to the SL slot where the SL feedback channel is located, the SL feedback information carried by the UL transmission channel.

Optionally, in the embodiment of the disclosure, the acquisition unit 410 is specifically configured to, for each time interval in the time interval set, determine the SL slot where the SL feedback channel is located by subtracting the time interval from an index of the slot for the UL transmission channel.

Optionally, in the embodiment of the disclosure, the acquisition unit 410 is specifically configured to, for each time interval in the time interval set, obtain an index of a UL slot by subtracting the time interval from an index of the slot for the UL transmission channel, and determine, according to the index of the UL slot, the SL slot where the SL feedback channel is located.

Figure 14:
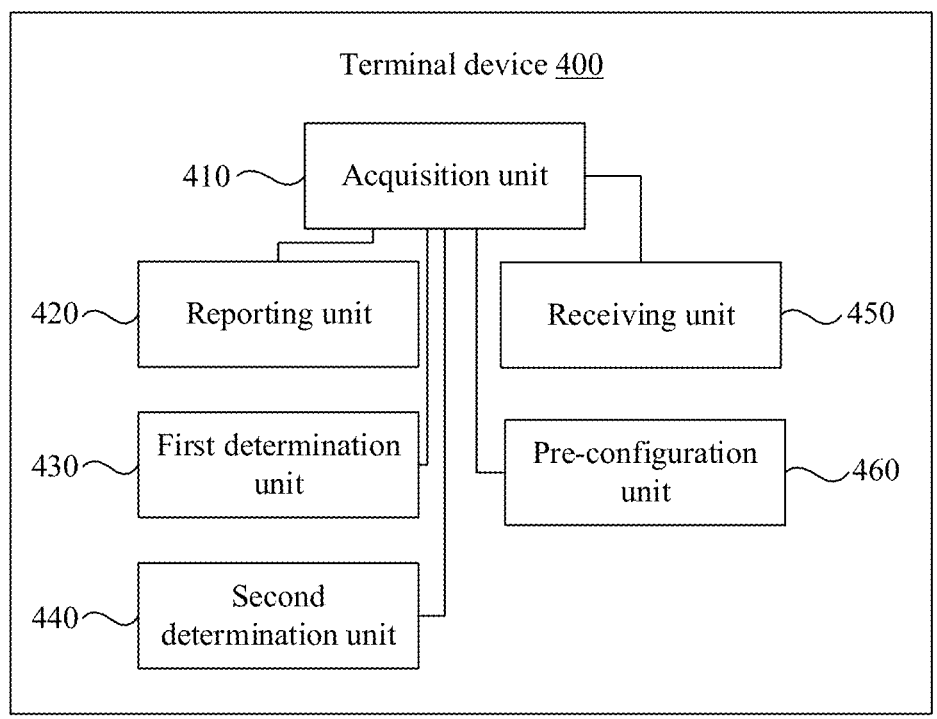
FIG. 14 is a schematic block diagram of a terminal device according to another embodiment of the disclosure.

As shown in FIG. 14, optionally, in the embodiment of the disclosure, the terminal device further includes a reporting unit 420.

The reporting unit 420 is configured to report the SL feedback information through the UL transmission channel in the slot for the UL transmission channel.

Optionally, in the embodiment of the disclosure, the time interval set includes at least one time interval.

Optionally, in the embodiment of the disclosure, the terminal device further includes a first determination unit 430, configured to determine, according to a number of elements in the time interval set, a total number of HARQ information fields of the SL feedback information carried by the UL transmission channel.

Optionally, in the embodiment of the disclosure, the terminal device further includes a second determination unit 440, configured to determine, according to a period of the SL feedback channel and a number of elements in the time interval set, a total number of HARQ information fields of the SL feedback information carried by the UL transmission channel.

Optionally, in the embodiment of the disclosure, the second determination unit 440 is specifically configured to determine, according to a period of a PSFCH, a number of PSSCH slots associated with one PSFCH slot, and determine, according to the number of elements in the time interval set and the number of PSSCH slots associated with one PSFCH slot, a total number of HARQ information fields of the SL feedback information carried by the UL transmission channel.

Optionally, in the embodiment of the disclosure, each PSSCH slot corresponds to one HARQ information field in the UL transmission channel.

Optionally, in the embodiment of the disclosure, each PSFCH slot corresponds to one HARQ information field in the UL transmission channel.

Optionally, in the embodiment of the disclosure, each PSFCH slot is associated with N PSSCH slots, and the HARQ information field corresponding to the PSFCH slot in the UL transmission channel carries SL feedback information corresponding to a PSCCH with a highest priority in the N PSSCH slots.

Optionally, in the embodiment of the disclosure, each PSFCH slot is associated with N PSSCH slots, and the HARQ information field corresponding to the PSFCH slot in the UL transmission channel carries SL feedback information corresponding to a last sent PSSCH in the N PSSCH slots.

Optionally, in the embodiment of the disclosure, each PSFCH slot is associated with N PSSCH slots, and the HARQ information field corresponding to the PSFCH slot in the UL transmission channel carries SL feedback information corresponding to a bit AND operation performed on SL feedback information corresponding to all PSSCHs sent in the N PSSCH slots.

Optionally, in the embodiment of the disclosure, the first determination unit 430 is further configured to, in a case where no PSSCH is sent in one of the N PSSCH slots, set, during the bit AND operation, the SL feedback information corresponding to the slot where no PSSCH is sent to be ACK.

Optionally, in the embodiment of the disclosure, one HARQ information field corresponds to one bit.

Optionally, in the embodiment of the disclosure, in a case where same SL data is transmitted in multiple PSSCH slots associated with the UL transmission channel, HARQ information fields corresponding to the multiple PSSCH slots in the UL transmission channel are in a same HARQ state.

Optionally, in the embodiment of the disclosure, a number of slots represented by the element in the time interval set is determined based on a size of at least one of a UL subcarrier or an SL subcarrier.

Optionally, in the embodiment of the disclosure, the UL transmission channel is a PUCCH or a PUSCH.

Optionally, in the embodiment of the disclosure, the SL feedback information carried by the UL transmission channel is a HARQ-ACK codebook carried by the PUCCH or the PUSCH.

Optionally, in the embodiment of the disclosure, the slot for the UL transmission channel is determined based on the time interval and a slot for the UL feedback channel.

Optionally, in the embodiment of the disclosure, the terminal device further includes a receiving unit 450, configured to receive RRC signaling or a SIB, the RRC signaling or the SIB including the time interval set.

Optionally, in the embodiment of the disclosure, the terminal device further includes a pre-configuration unit 460, configured pre-configure the time interval set in the terminal device.

The terminal device 400 in the embodiment of the disclosure may be realize the corresponding functions of the terminal device in the method embodiment. The process, function, implementation mode, and beneficial effect corresponding to each module (submodule, unit, component, or the like) in the terminal device 400 may refer to the corresponding descriptions in the method embodiment, and will not be elaborated herein.

It is to be noted that the function described with respect to each module (submodule, unit, component, or the like) in the terminal device 400 of the embodiment of the disclosure may be realized by different modules (submodules, units, components, or the like), or by the same module (submodule, unit, component or the like).

Figure 15:
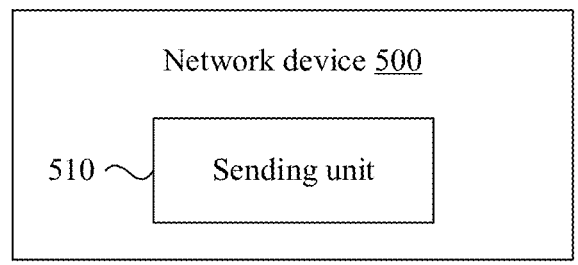
FIG. 15 is a schematic block diagram of a network device according to an embodiment of the disclosure.

FIG. 15 is a schematic block diagram of a network device 500 according to an embodiment of the disclosure. The network device 500 may include a sending unit 510.

The sending unit 510 is configured to send a time interval set, an element in the time interval set being used to determine a time interval between an SL feedback channel and a UL transmission channel, and the UL transmission channel being used to carry SL feedback information reported by a terminal device to the network device.

The sending unit 510 is further configured to send scheduling information, the scheduling information being used to determine a slot for the UL transmission channel.

Optionally, in the embodiment of the disclosure, the sending unit 510 is further configured to send RRC signaling or a SIB, the RRC signaling or the SIB including the time interval set.

Figure 16:
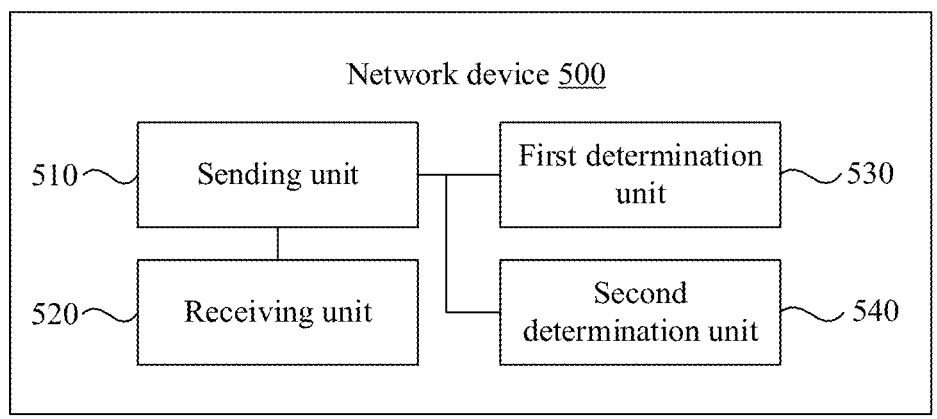
FIG. 16 is a schematic block diagram of a network device according to another embodiment of the disclosure.

As shown in FIG. 16, optionally, in the embodiment of the disclosure, the network device further includes a receiving unit 520, configured to receive the UL transmission channel in the slot for the UL transmission channel, the UL transmission channel including the SL feedback information.

Optionally, in the embodiment of the disclosure, the time interval set includes at least one time interval.

Optionally, in the embodiment of the disclosure, the network device further includes a first determination unit 530, configured to determine, according to a number of elements in the time interval set, a total number of HARQ information fields of the SL feedback information carried by the UL transmission channel.

Optionally, in the embodiment of the disclosure, the network device further includes a second determination unit 540, configured to determine, according to a period of the SL feedback channel and a number of elements in the time interval set, a total number of HARQ information fields of the SL feedback information carried by the UL transmission channel.

Optionally, in the embodiment of the disclosure, the second determination unit 540 is specifically configured to determine, according to a period of a PSFCH, a number of PSSCH slots associated with one PSFCH slot, and determine, according to the number of elements in the time interval set and the number of PSSCH slots associated with one PSFCH slot, a total number of HARQ information fields of the SL feedback information carried by the UL transmission channel.

Optionally, in the embodiment of the disclosure, each PSSCH slot corresponds to one HARQ information field in the UL transmission channel.

Optionally, in the embodiment of the disclosure, each PSFCH slot corresponds to one HARQ information field in the UL transmission channel.

Optionally, in the embodiment of the disclosure, each PSFCH slot is associated with N PSSCH slots, and the HARQ information field corresponding to the PSFCH slot in the UL transmission channel carries SL feedback information corresponding to a PSCCH with a highest priority in the N PSSCH slots.

Optionally, in the embodiment of the disclosure, each PSFCH slot is associated with N PSSCH slots, and the HARQ information field corresponding to the PSFCH slot in the UL transmission channel carries SL feedback information corresponding to a last sent PSSCH in the N PSSCH slots.

Optionally, in the embodiment of the disclosure, each PSFCH slot is associated with N PSSCH slots, and the HARQ information field corresponding to the PSFCH slot in the UL transmission channel carries SL feedback information corresponding to a bit AND operation performed on SL feedback information corresponding to all PSSCHs sent in the N PSSCH slots.

Optionally, in the embodiment of the disclosure, the first determination unit 530 is further configured to, in a case where no PSSCH is sent in one of the N PSSCH slots, set, during the bit AND operation, the SL feedback information corresponding to the slot where no PSSCH is sent to be ACK.

Optionally, in the embodiment of the disclosure, one HARQ information field corresponds to one bit.

Optionally, in the embodiment of the disclosure, in a case where same SL data is transmitted in multiple PSSCH slots associated with the UL transmission channel, HARQ information fields corresponding to the multiple PSSCH slots in the UL transmission channel are in a same HARQ state.

Optionally, in the embodiment of the disclosure, a number of slots represented by the element in the time interval set is determined based on a size of at least one of a UL subcarrier or an SL subcarrier.

Optionally, in the embodiment of the disclosure, the UL transmission channel is a PUCCH or a PUSCH.

Optionally, in the embodiment of the disclosure, the SL feedback information carried by the UL transmission channel is a HARQ-ACK codebook carried by the PUCCH or the PUSCH.

Optionally, in the embodiment of the disclosure, the slot for the UL transmission channel is determined based on the time interval and a slot for the UL feedback channel.

The network device 500 in the embodiment of the disclosure may be realize the corresponding functions of the network device in the method embodiment. The process, function, implementation mode, and beneficial effect corresponding to each module (submodule, unit, component, or the like) in the network device 500 may refer to the corresponding descriptions in the method embodiment, and will not be elaborated herein.

It is to be noted that the function described with respect to each module (submodule, unit, component, or the like) in the network device 500 of the embodiment of the disclosure may be realized by different modules (submodules, units, components, or the like), or by the same module (submodule, unit, component or the like).

Figure 17:
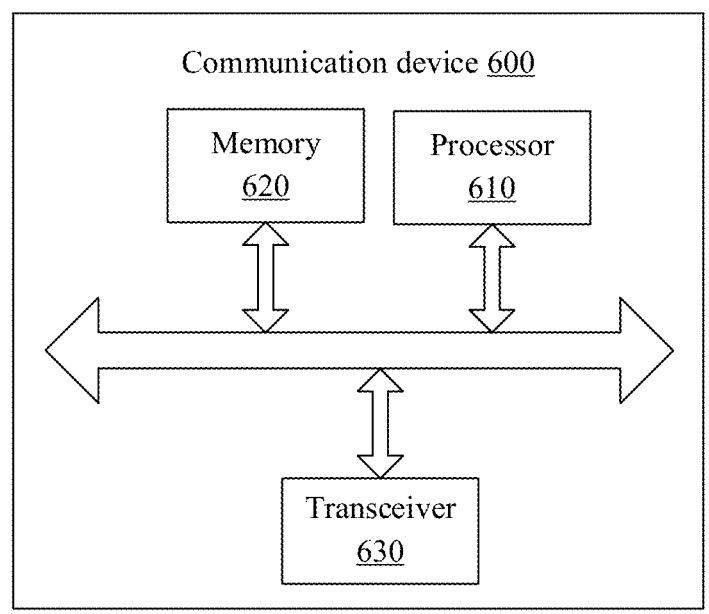
FIG. 17 is a schematic block diagram of a communication device according to an embodiment of the disclosure.

FIG. 17 is a schematic structure diagram of a communication device 600 according to an embodiment of the disclosure. The communication device 600 shown in FIG. 17 includes a processor 610. The processor 610 may call, from a memory, and run a computer program to implement the method in the embodiments of the disclosure.

Optionally, as shown in FIG. 17, the communication device 600 may further include a memory 620. The processor 610 may call, from the memory 620, and run a computer program to implement the method in the embodiments of the disclosure.

The memory 620 may be an independent device independent of the processor 610, or may be integrated into the processor 610.

Optionally, as shown in FIG. 17, the communication device 600 may further include a transceiver 630. The processor 610 may control the transceiver 630 to communicate with another device, specifically sending information or data to the other device or receiving information or data sent by the other device.

The transceiver 630 may include a transmitter and a receiver. The transceiver 630 may further include antennae. The number of the antennae may be one or more.

Optionally, the communication device 600 may be the network device of the embodiments of the disclosure. The communication device 600 may implement corresponding flows implemented by the network device in each method of the embodiments of the disclosure. For brevity, elaborations are omitted herein.

Optionally, the communication device 600 may be the terminal device of the embodiments of the disclosure. The communication device 600 may implement corresponding flows implemented by the terminal device in each method of the embodiments of the disclosure. For brevity, elaborations are omitted herein.

Figure 18:
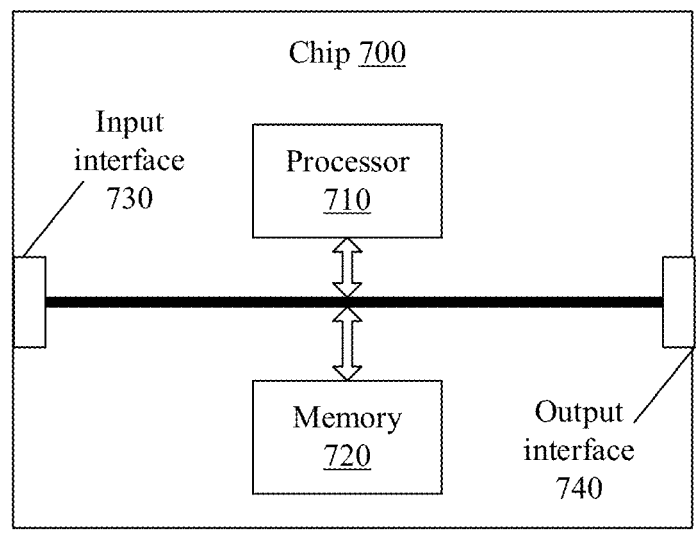
FIG. 18 is a schematic block diagram of a chip according to an embodiment of the disclosure.

FIG. 18 is a schematic structure diagram of a chip 700 according to an embodiment of the disclosure. The chip 700 shown in FIG. 18 includes a processor 710. The processor 710 may call, from a memory, and run a computer program to implement the method in the embodiments of the disclosure.

Optionally, as shown in FIG. 18, the chip 700 may further include a memory 720. The processor 710 may call, from the memory 720, and run a computer program to implement the method in the embodiments of the disclosure.

The memory 720 may be an independent device independent of the processor 710, or may be integrated into the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with another device or chip, specifically sending information or data to the other device or chip.

Optionally, the chip may be applied to the network device of the embodiments of the disclosure. The chip may implement corresponding flows implemented by the network device in each method of the embodiments of the disclosure. For brevity, elaborations are omitted herein.

Optionally, the chip may be applied to the terminal device of the embodiments of the disclosure. The chip may implement corresponding flows implemented by the terminal device in each method of the embodiments of the disclosure. For brevity, elaborations are omitted herein.

It is to be understood that the chip mentioned in the embodiment of the disclosure may also be referred to as a system-level chip, a system chip, a chip system, a system on chip, or the like.

The processor mentioned above may be a general-purpose processor, a Digital Signal Processor (DSP), a Field Programmable Gate Array (FPGA), an Application Specific Integrated Circuit (ASIC), or another programmable logical device, transistor logical device, discrete hardware component, etc. The general-purpose processor mentioned above may be a microprocessor, or any conventional processor, etc.

The memory mentioned above may be a volatile memory or a nonvolatile memory, or may include both volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the memory is described as an example rather than restriction. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). That is, the memory in the embodiments of the disclosure is intended to include, but not limited to, memories of these and any other proper types.

Figure 19:
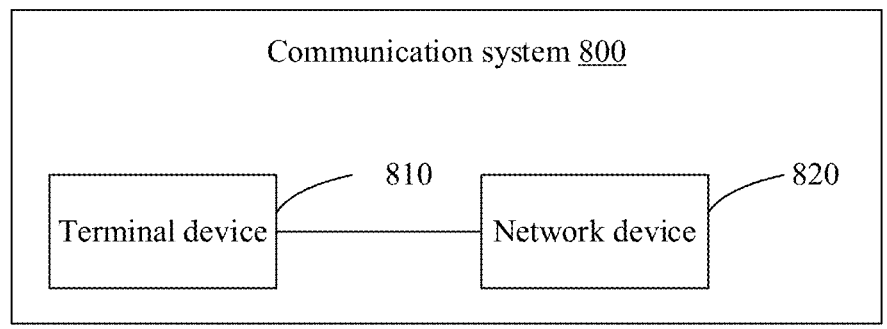
FIG. 19 is a schematic block diagram of a communication system according to an embodiment of the disclosure.

FIG. 19 is a schematic block diagram of a communication system 800 according to an embodiment of the disclosure. As shown in FIG. 19, the communication system 800 includes a terminal device 810 and a network device 820.

A terminal device 810 is configured to acquire a time interval set, an element in the time interval set being used to determine a time interval between an SL feedback channel and a UL transmission channel, and the UL transmission channel being used to carry SL feedback information reported by the terminal device to a network device.

The terminal device 810 is further configured to acquire, according to a slot for the UL transmission channel and the time interval set, the SL feedback information carried by the UL transmission channel.

The network device 820 is configured to send a time interval set, an element in the time interval set being used to determine a time interval between an SL feedback channel and a UL transmission channel, and the UL transmission channel being used to carry SL feedback information reported by a terminal device to the network device.

The network device 820 is further configured to send scheduling information, the scheduling information being used to determine a slot for the UL transmission channel.

The terminal device 810 may be configured to realize corresponding functions realized by the terminal device in the method. The network device 820 may be configured to realize corresponding functions realized by the network device in the method. For brevity, elaborations are omitted herein.

The embodiments may be implemented completely or partially by software, hardware, firmware, or any combination thereof. During implementation with software, the embodiments may be implemented completely or partially in form of a computer program product. The computer program product includes one or more computer instructions. When the computer program instruction is loaded and executed on a computer, the flows or functions described according to the embodiments of the disclosure are completely or partially generated. The computer may be a general-purpose computer, a special-purpose computer, a computer network, or another programmable device. The computer instruction may be stored in a computer-readable storage medium or transmitted from a computer-readable storage medium to another computer-readable storage medium. For example, the computer instruction may be transmitted from a website, computer, server, or data center to another website, computer, server, or data center in a wired (such as coaxial cable, optical fiber, and Digital Subscriber Line (DSL)) or wireless (such as infrared, radio, and microwave) manner. The computer-readable storage medium may be any available medium accessible for the computer or a data storage device integrated with one or more available media, such as a server and a data center. The available medium may be a magnetic medium (for example, a floppy disk, a hard disk and a magnetic tape), an optical medium (for example, a Digital Video Disk (DVD)), a semiconductor medium (for example, a Solid State Disk (SSD)), or the like.

It is to be understood that, in each embodiment of the disclosure, the magnitude of the sequence number of each process does not mean an execution sequence, and the execution sequence of each process should be determined by its function and an internal logic and should not form any limitation on the implementation of the embodiments of the disclosure.

Those skilled in the art may clearly know that specific working processes of the system, device, and unit described above may refer to the corresponding processes in the method embodiment and will not be elaborated herein for ease and brevity of description.

The above is only the specific implementation mode of the disclosure and not intended to limit the scope of protection of the disclosure. Any variations or replacements apparent to those skilled in the art within the technical scope disclosed in the disclosure shall fall within the scope of protection of the disclosure. Therefore, the scope of protection of the disclosure shall be subject to the scope of protection of the claims.

The invention claimed is:

1. A Sidelink (SL) feedback information processing method, comprising:
    acquiring, by a terminal device, a time interval set, an element in the time interval set being used to determine a time interval between an SL feedback channel and an Uplink (UL) transmission channel, and the UL transmission channel being used to carry SL feedback information reported by the terminal device to a network device; and
    determining, by the terminal device according to a slot for the UL transmission channel and the time interval set, the SL feedback information carried by the UL transmission channel,
    wherein the method further comprises:
    determining, by the terminal device according to a number of elements in the time interval set, a total number of Hybrid Automatic Repeat reQuest (HARQ) information fields of the SL feedback information carried by the UL transmission channel; or
    determining, by the terminal device according to a period of the SL feedback channel and a number of elements in the time interval set, a total number of HARQ information fields of the SL feedback information carried by the UL transmission channel.

2. The method of claim 1, wherein the determining, by the terminal device according to a slot for the UL transmission channel and the time interval set, the SL feedback information carried by the UL transmission channel comprises:
    determining, by the terminal device according to the slot for the UL transmission channel and a time interval in the time interval set, an SL slot where the SL feedback channel is located; and
    determining, by the terminal device according to the SL slot where the SL feedback channel is located, the SL feedback information carried by the UL transmission channel.

3. The method of claim 2, wherein the determining, by the terminal device according to the slot for the UL transmission channel and a time interval in the time interval set, an SL slot where the SL feedback channel is located comprises:
    for each time interval in the time interval set, determining, by the terminal device, the SL slot where the SL feedback channel is located by subtracting the time interval from an index of the slot for the UL transmission channel; or,
    the determining, by the terminal device according to the slot for the UL transmission channel and a time interval in the time interval set, an SL slot where the SL feedback channel is located comprises:
    for each time interval in the time interval set, obtaining, by the terminal device, an index of an UL slot by subtracting the time interval from an index of the slot for the UL transmission channel; and
    determining, according to the index of the UL slot, the SL slot where the SL feedback channel is located.

4. The method of claim 1, further comprising:
    reporting, by the terminal device, the SL feedback information through the UL transmission channel in the slot for the UL transmission channel.

5. The method of claim 1, wherein the time interval set comprises at least one time interval.

6. The method of claim 1, wherein one HARQ information field corresponds to one bit.

7. A Sidelink (SL) feedback information processing method, comprising:
    sending, by a network device, a time interval set, an element in the time interval set being used to determine a time interval between an SL feedback channel and an Uplink (UL) transmission channel, and the UL transmission channel being used to carry SL feedback information reported by a terminal device to the network device; and
    sending, by the network device, scheduling information, the scheduling information being used to determine a slot for the UL transmission channel,
    wherein the method further comprises:
    determining, by the network device according to a number of elements in the time interval set, a total number of Hybrid Automatic Repeat reQuest (HARQ) information fields of the SL feedback information carried by the UL transmission channel; or
    determining, by the network device according to a period of the SL feedback channel and a number of elements in the time interval set, a total number of HARQ information fields of the SL feedback information carried by the UL transmission channel.

8. The method of claim 7, further comprising:
    sending, by the network device, Radio Resource Control (RRC) signaling, the RRC signaling comprising the time interval set.

9. The method of claim 7, further comprising:
receiving, by the network device, the UL transmission channel in the slot for the UL transmission channel, the UL transmission channel comprising the SL feedback information.

10. The method of claim 7, wherein the time interval set comprises at least one time interval.

11. A terminal device, comprising:
a memory storing processor-executable instructions; and
a processor configured to execute the stored processor-executable instructions to perform operations of:
acquiring a time interval set, an element in the time interval set being used to determine a time interval between a Sidelink (SL) feedback information and an Uplink (UL) transmission channel, and the UL transmission channel being used to carry SL feedback information reported by the terminal device to a network device; and
determining, according to a slot for the UL transmission channel and the time interval set, the SL feedback information carried by the UL transmission channel,
wherein the processor is configured to execute the stored processor-executable instructions to further perform an operation of:
determining, according to a number of elements in the time interval set, a total number of Hybrid Automatic Repeat reQuest (HARQ) information fields of the SL feedback information carried by the UL transmission channel; or
determining, according to a period of the SL feedback channel and a number of elements in the time interval set, a total number of HARQ information fields of the SL feedback information carried by the UL transmission channel.

12. The terminal device of claim 11, wherein one HARQ information field corresponds to one bit.

13. The terminal device of claim 11, wherein the UL transmission channel is a Physical Uplink Control Channel (PUCCH).

14. The terminal device of claim 13, wherein the SL feedback information carried by the UL transmission channel is a HARQ-ACK codebook carried by the PUCCH.

15. The terminal device of claim 11, wherein the slot for the UL transmission channel is determined based on the time interval and a slot for the SL feedback channel.

16. The terminal device of claim 11, wherein the processor is configured to execute the stored processor-executable instructions to further perform an operation of:
receiving Radio Resource Control (RRC) signaling, the RRC signaling comprising the time interval set.

17. The terminal device of claim 11, wherein the determining, according to a slot for the UL transmission channel and the time interval set, the SL feedback information carried by the UL transmission channel comprises:
determining, according to the slot for the UL transmission channel and a time interval in the time interval set, an SL slot where the SL feedback channel is located; and
determining, according to the SL slot where the SL feedback channel is located, the SL feedback information carried by the UL transmission channel.

18. A network device, comprising:
a memory storing processor-executable instructions; and
a processor configured to execute the stored processor-executable instructions to perform operations of:
sending a time interval set, an element in the time interval set being used to determine a time interval between a Sidelink (SL) feedback information and an Uplink (UL) transmission channel, and the UL transmission channel being used to carry SL feedback information reported by a terminal device to the network device; and
sending scheduling information, the scheduling information being used to determine a slot for the UL transmission channel,
wherein the processor is configured to execute the stored processor-executable instructions to further perform an operation of:
determining, according to a number of elements in the time interval set, a total number of Hybrid Automatic Repeat reQuest (HARQ) information fields of the SL feedback information carried by the UL transmission channel; or
determining, according to a period of the SL feedback channel and a number of elements in the time interval set, a total number of HARQ information fields of the SL feedback information carried by the UL transmission channel.

19. The network device of claim 18, wherein the processor is configured to execute the stored processor-executable instructions to further perform an operation of:
sending Radio Resource Control (RRC) signaling, the RRC signaling comprising the time interval set.

20. The network device of claim 18, wherein the processor is configured to execute the stored processor-executable instructions to further perform an operation of:
receiving the UL transmission channel in the slot for the UL transmission channel, the UL transmission channel comprising the SL feedback information.

* * * * *